(12) United States Patent
Vincent et al.

(10) Patent No.: US 10,911,897 B2
(45) Date of Patent: Feb. 2, 2021

(54) LOCATING DEVICES

(71) Applicant: ARM IP Limited, Cambridge (GB)

(72) Inventors: Hugo John Martin Vincent, Cambridgeshire (GB); Daryl Wayne Bradley, Cambridgeshire (GB)

(73) Assignee: ARM IP Limited, Cambridge (GB)

( * ) Notice: Subject to any disclaimer, the term of this patent is extended or adjusted under 35 U.S.C. 154(b) by 0 days.

(21) Appl. No.: 15/066,828

(22) Filed: Mar. 10, 2016

(65) Prior Publication Data

US 2016/0286363 A1    Sep. 29, 2016

(30) Foreign Application Priority Data

Mar. 27, 2015 (GB) ..................... 1505344

(51) Int. Cl.
*H04W 4/02* (2018.01)
*H04L 29/08* (2006.01)
(Continued)

(52) U.S. Cl.
CPC .......... *H04W 4/029* (2018.02); *G01C 21/005* (2013.01); *G01C 21/206* (2013.01);
(Continued)

(58) Field of Classification Search
CPC ..... H04W 4/008; H04W 64/00; H04W 4/025; H04W 24/10; H04W 8/005;
(Continued)

(56) References Cited

U.S. PATENT DOCUMENTS

2006/0073794 A1* 4/2006 Stortoni ............. G06K 19/0716
455/88
2006/0109811 A1* 5/2006 Schotten ................... G01S 1/68
370/328
(Continued)

FOREIGN PATENT DOCUMENTS

WO    WO 2006/136985 A1    12/2006
WO    WO 2006136985 A1 *  12/2006    ......... H04L 12/2803
WO    WO 2013/063495 A1    5/2013
(Continued)

OTHER PUBLICATIONS

Search Report dated Aug. 27, 2015 for Application No. GB1505344.0, 5 pages.
(Continued)

*Primary Examiner* — George Eng
*Assistant Examiner* — Jing Gao
(74) *Attorney, Agent, or Firm* — Patterson Thuente Pedersen, P.A.

(57) ABSTRACT

A system for automatically ascertaining the location of wireless functional devices, such as lights and switches, in a building. Information from the devices is generated by receipt of electromagnetic signals from other devices, to calculate a best fit for the relative location of the devices in relation to each other. Preferably a map of the building is adduced to refine the location process, for instance by tying the location of a light switch to a wall or a light to a ceiling. The information is used to ascertain that, for example, two devices are in the same room and can be associated with each other. Account can be taken of variable features of the building such as partition walls, to update device settings. There is thus no need to survey the building manually.

17 Claims, 3 Drawing Sheets

(51) Int. Cl.
*H04W 4/33* (2018.01)
*G01S 5/02* (2010.01)
*G01C 21/20* (2006.01)
*G01S 11/06* (2006.01)
*H04W 4/029* (2018.01)
*G01C 21/00* (2006.01)
*H04W 4/70* (2018.01)

(52) U.S. Cl.
CPC ............. *G01S 5/0284* (2013.01); *G01S 11/06* (2013.01); *H04L 67/12* (2013.01); *H04W 4/023* (2013.01); *H04W 4/33* (2018.02); *H04W 4/70* (2018.02)

(58) Field of Classification Search
CPC ... H04W 28/0226; H04W 4/00; H04W 4/021; H04W 4/023; H04W 4/028; H04W 4/043; H04W 64/003; H04W 84/12; H04W 4/33; H04M 1/72569; H04M 1/72572; H04M 1/72577; H04M 2250/12; H04L 67/12; G01C 21/005; G01C 21/206; G01S 5/0284
See application file for complete search history.

(56) References Cited

U.S. PATENT DOCUMENTS

| | | | | |
|---|---|---|---|---|
| 2006/0250980 | A1* | 11/2006 | Pereira | H04L 12/2809 370/254 |
| 2011/0309933 | A1* | 12/2011 | Marino | G01S 5/0252 340/539.32 |
| 2012/0184209 | A1* | 7/2012 | Wengrovitz | H04L 67/125 455/41.2 |
| 2013/0109406 | A1* | 5/2013 | Meador | H04L 67/125 455/456.1 |
| 2013/0214909 | A1* | 8/2013 | Meijers | H04W 4/029 340/10.5 |
| 2016/0374045 | A1* | 12/2016 | Pandharipande | G01S 1/68 |

FOREIGN PATENT DOCUMENTS

| | | | |
|---|---|---|---|
| WO | WO 2014/144760 A1 | 9/2014 | |
| WO | WO-2014144760 A1 * | 9/2014 | ............. G06Q 30/02 |

OTHER PUBLICATIONS

Examination Report dated Jul. 23, 2020 for GB Application No. 1505344.0, 6 pages.

\* cited by examiner

LOCATING DEVICES

RELATED APPLICATION

The present application claims priority to GB Application No. 15053440.0 filed Mar. 27, 2015, which is hereby incorporated herein in its entirety by reference.

TECHNICAL FIELD

The present techniques relate to a system for deriving location or configuration information for functional wireless devices distributed around a building.

FIELD OF THE INVENTION

In the Internet of Things (IoT), it is known for devices, or "agents", whether mobile or stationary, to communicate with, for example, other IoT devices or a server in order to exchange information, for instance about their surroundings, about the building in which they are located, or about their operational state. For location of the devices themselves, satellite systems such as GPS can be used, but these are often not as effective indoors, for want of an adequate signal. Further, IoT devices may be power-limited, expecting to last months or years on a very small battery, or even rely on harvested energy.

Devices can be associated with each other in a network, and new devices can be associated with an existing network. It has been proposed to locate mobile devices indoors by means of fixed known reference points operating wirelessly, with a previously surveyed floor plan as reference.

SUMMARY OF THE INVENTION

In an embodiment there is provided a data processing apparatus for locating functional devices in a building. In a second embodiment there is provided a method for deriving location data in a system including a control unit and a plurality of controlled functional devices in a building. Further embodiments relate to buildings using such apparatuses and methods.

Embodiments can be deployed in a network of devices within a building, or a complex of buildings, not necessarily all in the same location.

Preferred embodiments can provide location information based purely on signal strengths and basic map information. At a high level, the general concept is that of enabling (relative) location determination of devices for a service or application, such as the control of lighting, heating, ventilation and air conditioning (HVAC) or alarms, in a building. The service may request that a device generate some form of operation, such as a communication or data sequence, or a particular operation might be carried out by a user, such as turning on a light, which is then capable of being sensed by one or more other devices.

These other devices then report back the resulting information to the service/application, under the control of the data-processing apparatus or server, which then determines, at least to an approximation, the location of each device relative to the others. Using mapping details of a building arrangement (e.g. walls and any other information available) may help to provide improved location information based on the approximation obtained from the signalling between the devices. One such example of signalling information is signal strength. Mesh networks may be used in such systems and it is well known that radio systems/chips in such networks provide information such as received signal level. This information is not generally directly relevant to the service itself but can be used for location determination.

In many embodiments, the precise position of individual devices is not needed; it is the application/service using them that uses the information about the relative and "logical" or topographical positioning of devices (for example which room one or more devices are located in). This information may be used to determine which devices are to be associated with which other devices, for instance because they are in the same room and/or are involved in the same function (e.g. light switch and light fitting). It will be appreciated that, in many embodiments, positioning information need only be approximate and simply require determining which device has a higher probability of being positioned in a particular room of a building; or on a particular floor; or closest to a particular control unit. Accordingly, fine-grained positioning information is non-essential in many embodiments; it is only the logical positioning information that may be needed.

The devices may therefore not need sensors beyond their wireless communication capability: the control unit, or data-processing apparatus or server, uses the data it receives to work out a best approximation for location.

As noted above, signal strength is one example of a way to determine the relationships and relative location of wireless devices. In many wireless communication systems, signal strength and/or signal-to-noise ratio data is capable of being determined by a receiving device. In embodiments, the data may then be used to determine a relative positioning of other devices communicating with the receiving device. By way of example, Bluetooth Low Energy (BLE) receivers may provide a received signal strength indicator (RSSI) or received channel power indicator (RCPI) measurement of power present in a received radio signal.

However, it would also be possible to identify approximate location based on other metrics, such as detecting light level in combination with such aspects of the system as a user's, or the system's, turning lights on and off; light patterns; control of temperature or air conditioning, barometer and height determination. Other devices can then report back such detected signal values to the service. This means that some devices may use existing sensor capabilities, obviating the need for additional capabilities.

The above location-determination process may take place once an area-wide commissioning and provisioning of devices has been carried out, for example, in a building. Such devices may include, for example, light bulbs, light switches, smoke alarms, security devices, motion sensors (e.g. for turning lights on only in rooms with people in), control panels and HVAC control units, and may additionally include devices that people temporarily bring in to the building, such as mobile devices that a person may want to use to control one or more of the other devices. By "provisioning" is meant an initializing or updating process that connects/registers a device with the device server of the system. Further, when combined with physical information about the configuration of the building, such as layout, wall arrangements, construction (e.g. glass, brick, temporary partition), door positioning, this information may be combined with the receiving signal to determine a more accurate representation and approximate arrangement of devices.

In enhancements to the above, each device may have various parameters and meta-data associated with it, including details indicating that it has been provisioned, its device type (e.g. switch, light etc.), various operational parameters, including whether it is a battery-powered device (and, if so, the current battery level), whether it is powered by energy harvesting (e.g. a switch) or mains-powered.

One or more of the above parameters may then be used to determine whether the device should be used for the process of generating signal information to be received by another device—for example, it may be preferable to use devices that run off mains power, rather than others that are powered by a battery or that use energy-harvesting, so that energy can be saved. Additionally or alternatively, a measured battery/energy level in a device may be first received by the service or application performing the relative positioning determination, so that it can prioritize the use of those with more stored energy available.

In some embodiments it may be desirable to perform a refresh of the location information periodically by randomly or systematically running through a recalibration/check cycle. A systemic cycle of this kind could be, for instance, a check every night, when the building is empty, to note any devices that have been moved during the day. Alternatively or additionally, a check can be carried out whenever a new device is added to the system and/or on a manual request. Devices that have various parameters or characteristics indicative that they are more likely to be fixed to a wall/ceiling (e.g. device type=switch) or elsewhere may have their location re-checked at a lower frequency than others that may have a higher probability of moving (e.g. device type=portable thermostat), thus making the process more efficient. Similarly, the frequency of the location information refresh for battery-powered or energy-harvesting-based devices may be different (e.g. lower) than for those having a higher stored power level. Efficiency in selecting devices for signal emission and reception is desirable also from the point of view of bandwidth.

Some devices may deny providing information useable for determining location, and thereby prevent propagation of any such information.

In some environments there may also be a desire to re-trigger a location check when certain actions are initiated, in addition to the scheduled checks. By way of example, many office environments have offices with walls that fold away to enlarge a meeting room. The measurement of light level using one or more light sensors would enable determination of whether a wall was present or folded away, initiating modifications to the light switch control and HVAC accordingly. Received signal strength may also change depending on the presence of a moveable partition wall. In embodiments, the ability to move a wall may be part of the building plan/physical information that is readable by the service/application providing the relative positioning information.

Should a person in the building register a portable device (e.g. phone, tablet, personal envoy or authentication device) with the building network (via provisioning), the location of such a portable or moveable device relative to others may be obtainable (for example, in embodiments to an approximate location within a room, or more approximately to identify the room in which the device is present). On use or connection, or on manual request or periodically, the application/service may gather information on the whereabouts of that portable device. Referring back to previous paragraphs, such a device would have information (e.g. device type) indicating that it has a higher probability of moving around in the environment therefore the service may monitor location more frequently. Such information may be useful as it may enable control of local devices—e.g. upon determination that a device is in room 1, the portable device would then control lighting/HVAC in room 1; moving to room 2, then the same operations on the portable device would control room 2.

One principle involves harnessing given information about the environment in order to determine location information, e.g. awareness of walls and wall materials, floors, room size, and so on; this information then supports that derived from the signal measurement. Such information may include whether any walls or other aspects are moveable or variable or redeployable, and then factoring this into the analysis performed by the application/service.

Information from such a system may be useful for the examples described above, but may also be useful in the creation of physical device-based search engines. Such information may then be provided to a service/application providing control of one or more types of devices.

BRIEF DESCRIPTION OF THE DRAWINGS

For a better understanding, examples will now be described by way of example, referring to the attached drawings, in which.

DETAILED DESCRIPTION

Figure 1:
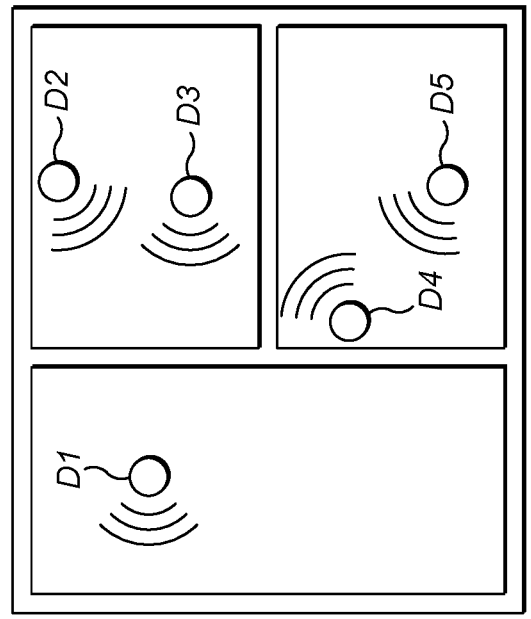
FIG. 1 schematically shows a network of devices in a confined location such as a building, with the notional connections between, together with an illustrative example of a server and services communicating with the network of devices.
Figure 1:
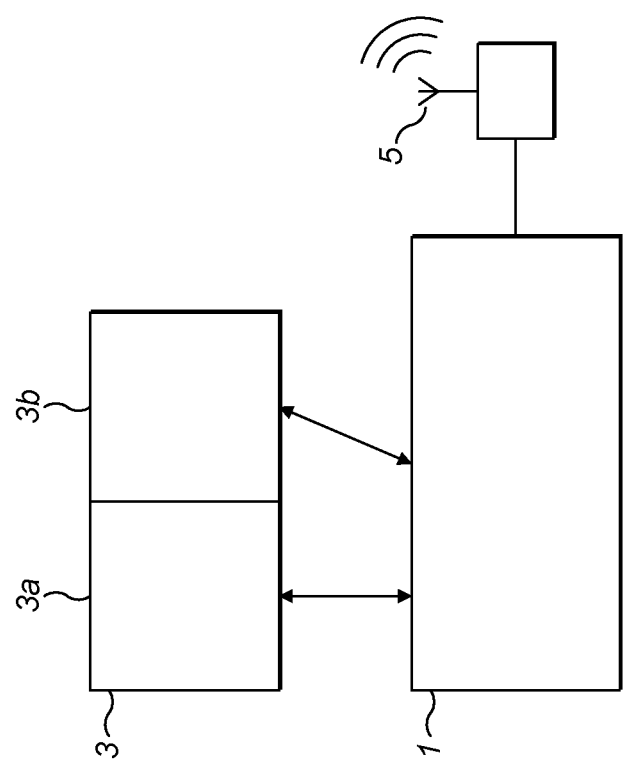

In FIG. 1 five functional devices D1-D5, i.e. devices having a function within the building other than merely being a point of reference, are shown schematically by way of simplified example, each being positioned in a building having three rooms. The layout is shown as two-dimensional for simplicity, though normally it would involve height also, both within rooms and between floors. The devices may be associated with one or more services 3a, 3b, here lighting and HVAC respectively, being functions incorporated into the building. The devices and services are under the control of a data-processing apparatus or server 1, exchanging data, as shown by arrows, and in wireless communication with the devices by means of an antenna 5.

Each device, which will typically be an 'IoT-enabled' device capable of wireless communication with the server 1 and may comprise, for example, an electrical device for a building, such as a light, a light switch, a clock, a control unit for air conditioning, a sensor (for example alarm, proximity, human presence, movement, or environmental sensors such as temperature, pressure) and so on, or a mobile device such as a laptop computer, having a radio transmitter/receiver. However, it is usually of low power, if the device is not connected to the mains, and might have no sophisticated built-in computing facility. Its purpose may be merely to communicate with a control unit or central or distributed server, in the same building or elsewhere, or in the Cloud, so that the device can be operated in a flexible way and remotely controlled. Devices D1-D5 communicate, directly or indirectly (via other devices), with the device server which controls provisioning, signalling to devices, and may also provide the location-determining capabilities (although in other embodiments it will be appreciated that this may be provided via a separate, but connected, server, or one of the service applications.)

Once the devices are provisioned, the server knows what devices are included in the network, but not where they are logically located. However, for the control to be efficient, the location of the devices should be known—for instance, switches should be associated with their respective controlled equipment, not with, say, a compatible device located in a different room. To this end, the server interrogates the devices in turn (or as many as are needed) to ascertain the strengths of the signals they receive from all, or a subset of, the other devices. The signals would be, for example, those exchanged when performing a normal service operation, such as taking a temperature reading or operating a switch. The server therefore sends a command signal to activate a particular device, which signals back to indicate that the command has been carried out, and signals to the other devices, or some of them, to measure and report the signal strength received from the commanded device. It will be appreciated that, given the building plan, logical location is sufficient in many instances to determine which provisioned devices are to be configured to interact with one another via the service/application communicating with such devices. Physical location (e.g. precise location in a 3-dimensional space) is not necessary.

Alternatively a series of diagnostic test sequences may be used in which devices are communicated with and instructed to generate a signal; then one or more other devices may be configured to receive the signal and communicate this information to the server running an application or service. It is best to select devices at different locations, say, in a room—interrogating two devices next to each other on the same wall would not yield much additional information.

The server then carries out an operation to determine the best fit of the collective data with a set of positions of the devices on a known floor plan. This can be done by a suitable algorithm, such as an iterative algorithm, or regression analysis. The methods can use triangulation, arrival time or delay, signal phase, signal direction and signal strength, among others when the measurements are based on wireless communication. Stored criteria are used for making the most likely identifications—for instance, a vertical difference of less than about 1 m implies that the two devices are on the same floor.

Figure 2:
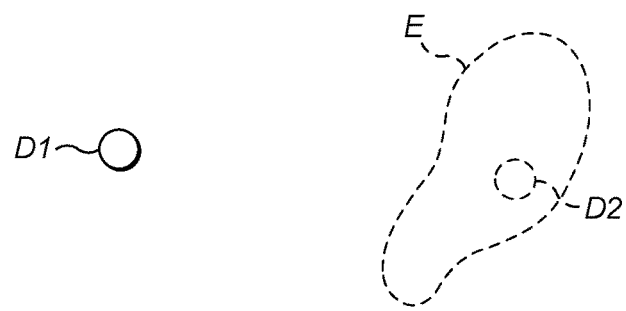
FIG. 2 shows a part of a location process.

In a preferred embodiment, signal strength is measured and a least-squares analysis is preferably used. Measuring signal strength circumvents the problem common in buildings that there is no line of sight between various devices, especially if they are in different rooms. The best fit of the observed signal strengths is found for all the devices addressed. A single measurement from one addressed device would give rise to an irregular area or "ellipse" for each of the other devices, in which it was likely to be located. One such area E is shown in FIG. 2 for two of the devices D1, D2. Repeating the process with more devices and taking the intersection of areas as often as necessary gives a probable relative layout as shown in FIG. 1. The calculation can be done in a known manner.

Figure 3:
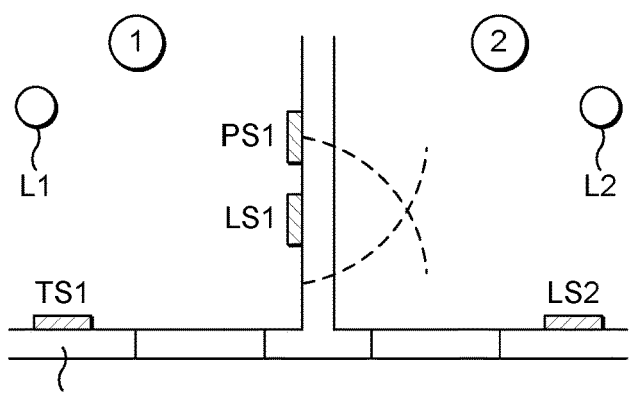
FIG. 3 shows a partial plan view of a room with various devices.

Rather than conduct a survey specifically for the purpose of locating the various wireless devices in a building, using the present techniques the existing functionality of the devices is put into service to locate them. It is only required that the devices can send and/or receive signals. An example is shown in FIG. 3. Here various wireless devices are shown in rooms 1 and 2 of a building. Room 1 contains a thermostat TS1, a light switch LS1 and PIR (passive infrared) sensor PS1 on the walls of the room, and a light L1 on the ceiling, in the middle of the room. These devices are all capable of communicating with a server device and/or one another in some embodiments, for example via a mesh network, rather than being physically wired directly to one another accordingly to conventional methods of switching and sensing. The building has a central server, not shown in FIG. 3. When the devices integrated into the building are commissioned, the locations of the devices can be ascertained, and the functional associations, or 'pairing' determined, by the method set out below. For the avoidance of doubt, when we say 'paired' here, what is meant is an active relationship between two or more devices in which one is capable of controlling or initiating an operation on another. Such a methodology allows flexibility in room planning and configuration, meaning IoT-enabled switches could be repositioned and moved between rooms, or additional devices flexibly added, without needing to consider costly installation and wiring.

To do this, one or more devices may measure the signal strength of communications received from other devices (e.g. within a mesh-style network) and this information is communicated, along with other identification material transferred in the data communication packets, to the central server. A light switch, LS1, may for example broadcast a signal which is receivable by other devices, e.g. light L1 in room 1 and light L2 in room 2. Similarly switch LS2 may do the same. The control unit/server then computes logical/approximate relative locations of the devices, and finds the best fit of the data (L1 receiving a higher signal strength from LS1, and L2 from LS2). Hence a logical map of device locations is determined enabling relevant devices located in the same logical location to be associated with one another (e.g. switch with light fitting).

In another variant, the control unit issues commands to devices, such as the light L1, to perform their normal or "service" function, i.e. light on/light off. One or more of the light switches, e.g. LS1, LS2, may comprise a light sensor to sense the light level. The signal emitted by the switch LS1 is detected not only by the light L1 but also by any other devices incorporating the appropriate sensor (light in this case), which may optionally include the thermostat TS1 and the PIR sensor PS1. The information on the detected signal strength is then transmitted to the control unit (server). The control unit then computes approximate relative locations of the devices, for instance along the lines of what is shown in FIG. 2, and finds the best fit of the data. Hence an approximate map of relative locations is generated.

Moreover, the PIR sensor PS1 (which may be integrated into LS1 in some embodiments) might also detect the light being turned on; from this, the system concludes, subject to the construction of the walls, that it is in the same room. In the event that further devices sense the presence of light (for example, a PIR embedded in LS2) then this may be indicative of either the presence of a translucent wall or that there may be more than one switch/PIR in the same room. Further measurements may optionally be taken (for example radio signal levels) to make a further assessment of the approximate positioning of devices—a large difference between signal levels measured on two PIRs (integrated into LS1 and LS2 for example) would be indicative of the presence of a partition wall between the two, rather than being positioned in the same room.

When the building is in use, the control unit/server can be set to update its information periodically, either in terms of time or in terms of number of service operations. Also, whenever a new device is provisioned, in particular a mobile device M, the signal strength of the signal received from this device is used to compute its location and to revise, if necessary, the data on the fixed devices. Some of the wall-mounted devices themselves need not be fixed, since they operate wirelessly. Some of these devices may incorporate energy-harvesting capabilities, e.g. using photocells or charge storages when the switch is pushed by a user.

In general, devices in other rooms will also detect a signal. For instance, the light switch LS2 in the next room will receive a somewhat attenuated signal. The control unit will conclude that LS2 is some distance away from LS1.

Moreover, there will probably still be considerable uncertainty after this process, because signals can vary, and in any event the building will affect the signal strength in various directions by absorption and reflection.

As previously mentioned, the known structure of the building may be taken into account. A plan of the building is stored in the control unit/server, and the best fit of the supposed relative layout of the devices to the known plan of the building is found, for instance by further Bayesian analysis, and using data on the constitution of the walls and floors.

Figure 4:
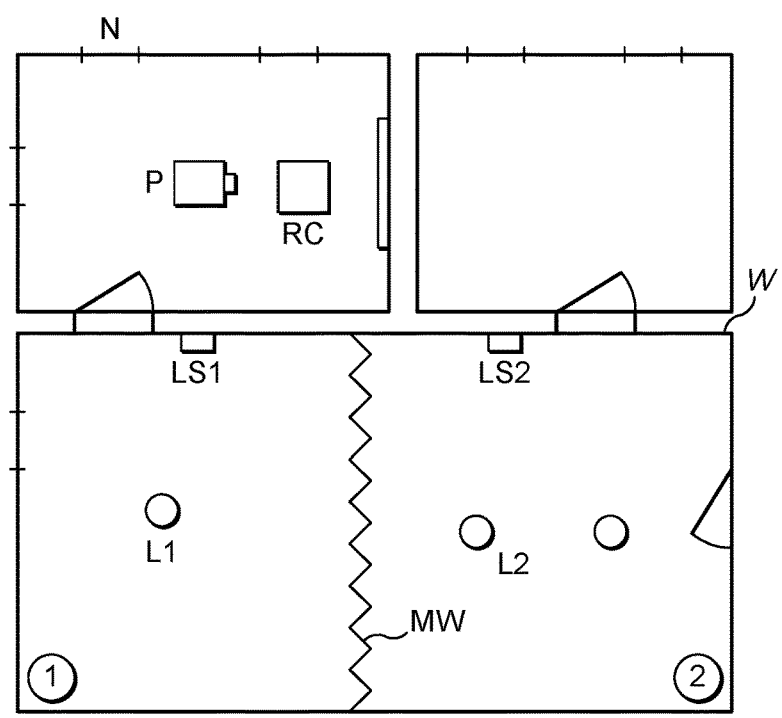
FIG. 4 shows a diagram similar to FIG. 1, with an estimated relative location range for a pair of devices.

A simplified floor plan, showing walls W, windows N, doors D and various devices, such as light switches LS, air-conditioning controls AC and a projector P, is shown in FIG. 4. Where it is known that a given device D1, for instance, is a light switch, then it must be located on a wall W. A light L, on the other hand, will be located on a ceiling (not shown in the two-dimensional representation of FIG. 3). In this way the "ellipses" can be made considerably smaller.

The interrogation, or survey, of the devices, and the resulting calculation, is repeated as required. One reason is if a first round leads to contradictory results ("pathological ellipses", where the areas for a given device estimated from two measurements do not overlap). In order to conserve the power of battery or other non-mains-powered devices, they might initially be excluded from the procedure, but they could then be included for additional accuracy or to resolve uncertainty, or simply at a lower frequency than the mains-powered devices.

In any event, the survey is carried out at intervals, either on a regular basis, as a check that all the devices are working, or to see whether any devices have moved, or when a new device is introduced—itself either a new permanent device, if for instance a new piece of apparatus such as a projector P, or a temporary device such as a mobile phone M. This repeat calculation gives a location for the new device, and possibly revises the calculations for existing devices. For routine checking purposes, the server can be configured to repeat the survey at any time, for instance periodically, say once a day, using all or a subset of the functional devices.

FIG. 4 also shows a moveable wall MW. This is a partition wall between two rooms 1 and 2 which can be folded back to make a larger room. When the moveable wall is folded back, sensors in one room can directly detect signals from the light switch in the other room. The control unit/server can then conclude that the partition wall is drawn back and ensure, for instance, that any light switches in the now combined rooms will operate the lights in both rooms. When the wall is closed again, the system reverts to its former state. Detectors in the room or moveable partition wall may be used to detect the repositioning of the wall and trigger a re-processing for sensors previously determined to be in the local vicinity; other devices may then reconfigure automatically to operate additional (or fewer) controllable devices in rooms 1 and 2, i.e. the system may self-configure so that with the wall folded away LS1 and LS2 control both L1 and L2, and when the wall is expanded to divide the rooms, they control their respective lights.

The system is also designed to note an unexpected loss of signal, as when a device breaks down, and to send an appropriate notification so that repair can be carried out.

Figure 5:
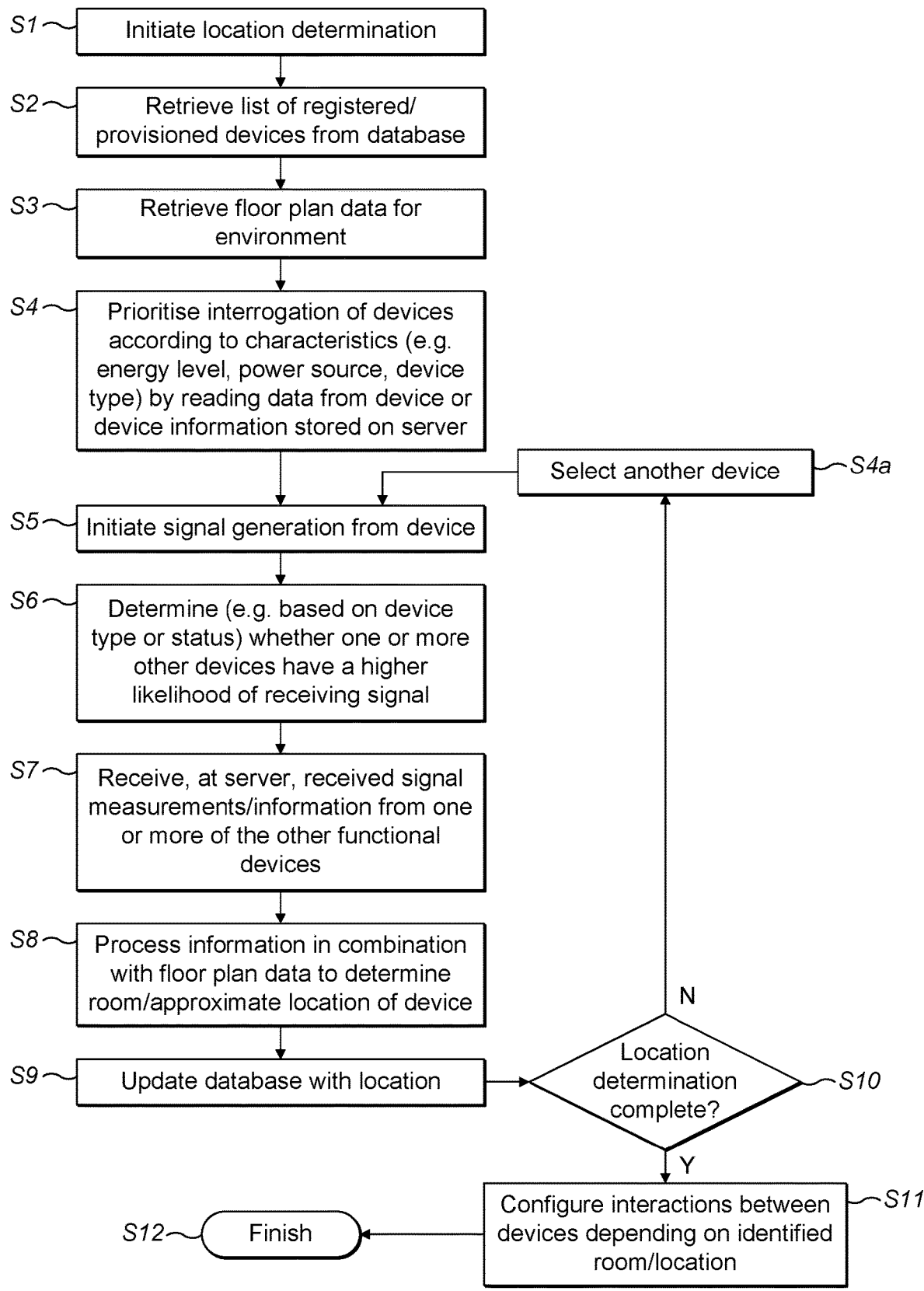
FIG. 5 shows a flow chart demonstrating one way in which the service/application may determine the location and interaction of devices.

FIG. 5 shows a flow chart of a typical sequence of operations that can be carried out by a system as envisaged herein. The process is initiated at step (S1). This could be, for instance, a routine survey cycle to check that all devices are correctly logged and functioning. The details of the devices already known to the system are retrieved from a database (S2), and the building data (floor plan, nature of walls, location of fixed devices) likewise retrieved (S3).

The characteristics of the known devices are then ascertained (S4), from stored information on the server or directly from the devices, and then a weighting is given to each device to prioritize those least sensitive to the drain in energy from signal generation (e.g. mains-powered). These devices are then instructed, at step S5, to generate a signal to be detected by other devices. An estimation is made at step S6 of suitable devices for this purpose, so as to minimize the number of operations. The measurements made from the detected signals are sent to the server, as at step S7.

The server then finds (S8) the best match of the device under test, with the aid of the known building information, including the floor plan, and the location and connectivity information of the current device is added to the database (step S9). The process is repeated (S10, S4a) until all devices are accounted for, at which stage interactions between devices are configured depending on the identified location (S11), after which the process ends (S12).

The invention claimed is:

1. A data-processing apparatus for locating functional devices in a building where each functional device has one or more associated parameters, the functional devices being capable of emitting and/or receiving electromagnetic radiation, the data-processing apparatus being configured to be in communication with and control functions of at least some of the functional devices;
  wherein the data-processing apparatus performs two or more survey operations, each survey operation determines a logical location between a first device and one or more further devices, wherein, for each survey operation, the data-processing apparatus configured to:
  transmit a targeted command signal addressed to the first device to cause the first device to generate an electromagnetic signal;
  receive, from the one or more further devices, information on a detected signal strength of the electromagnetic signals from the first device;
  determine the logical location of the first device in relation to the one or more further devices based on data defining a configuration of at least a portion of the building and the received information on the detected signal strength of the electromagnetic signal from the first device, wherein the data defining the configuration of at least the portion of the building includes a plan of at least the portion of the building, the plan comprising a location of a physical building component and a physical characteristic of the physical building component including a layout and a wall arrangement; and
  configure interactions between the first device and the one or more further devices based on the determined logical location, wherein the two or more survey operations are performed at intervals determined by the one or more parameters associated with the first device.

2. The apparatus according to claim 1, wherein the information received from the one or more further devices includes received signal strength and/or signal-to-noise ratio.

3. The apparatus according to claim 1, wherein the information received from the one or more further devices includes one or more environmental measures comprising one or more of a detected light level, ambient temperature and/or a pressure.

4. The apparatus according to claim 1, further configured to initiate reception of information selectively from the functional devices in dependence on existing data about location and/or power supply and charging levels of the functional devices.

5. A distributed wireless system including the data-processing apparatus according to claim 1 and a plurality of the functional devices.

6. The distributed system according to claim 5, wherein the functional devices include one or more of the following: light bulbs, light switches, smoke or intruder alarms, security devices, motion sensors, proximity sensors, control panels and HVAC control units, mobile devices.

7. The distributed system according to claim 5, wherein some of the functional devices are battery-powered or powered by energy-harvesting.

8. The distributed system according to claim 5, wherein the data-processing apparatus is configured to interrogate the functional devices at set or random intervals, or when further information is needed, or when a new functional device is introduced to the system.

9. A building containing the distributed system according to claim 5, at least some of the functional devices being located in rooms in the building.

10. A method for deriving location data in a system including a control unit and a plurality of controlled functional devices in a building, the plurality of the controlled functional devices being configured to communicate wirelessly, where each controlled functional device has one or more associated parameters, the method comprising:
performing two or more survey operations, each survey operation determines a logical location between a first device and one or more further devices, wherein, for each survey operation, the control unit is configured to:
transmit a targeted command signal addressed to the first device to cause the first device to generate an electromagnetic signal;
receive, from the one or more further devices, information on a detected signal strength of the electromagnetic signal from the first device;
determine a logical location of the first device in relation to the one or more further devices based on data defining a configuration of at least a portion of the building and the received information on the detected signal strength of the electromagnetic signal from the first device, wherein the data defining the configuration of at least the portion of the building includes a plan of at least the portion of the building, the plan comprising a location of a physical building component and a physical characteristic of the physical building component including a layout and a wall arrangement; and
configure interactions between the first device and one or more further devices based on the determined logical location,
wherein the two or more survey operations are performed at intervals determined by the one or more parameters associated with the first device.

11. The method according to claim 10, wherein the determination is carried out at predetermined, or arbitrary, or random, or manually chosen, intervals, or a combination.

12. The method according to claim 10, wherein the determination is carried out following notification of a change in the system, comprising addition of a device to the system.

13. The method according to claim 10, wherein the determination is carried out by at least one of the following: detecting light level in combination with a user's turning lights on or off; light patterns; control of temperature or air conditioning, barometer and height determination.

14. The method according to claim 10, wherein the parameters include whether a controlled functional device is powered by battery or energy-harvesting.

15. The method according to claim 10, wherein the parameters include a predetermined probability of each controlled functional device moving.

16. The method according to claim 10, including a further step of associating the functional devices with other devices based on function and determined location of the functional devices and the other devices.

17. The method of associating a control device, capable of controlling a second device of the plurality of functional devices in a same environment, the method comprising using the method in accordance with claim 10 to determine the logical location of the control device and the second device, including to determine that the control device is in a same room of a building as the second device, and enabling the control device to control operation of the second device.

* * * * *